(12) United States Patent
Hicks et al.

(10) Patent No.: US 7,027,813 B2
(45) Date of Patent: Apr. 11, 2006

(54) SYSTEM AND METHOD FOR HOME NETWORK DETERMINATION IN A MOBILE PHONE

(75) Inventors: Scott G. Hicks, Apex, NC (US); Sam Mullis, Apex, NC (US); Bassam Jarrad, Apex, NC (US)

(73) Assignee: Sony Ericsson Mobile Communications AB, (SE)

( * ) Notice: Subject to any disclaimer, the term of this patent is extended or adjusted under 35 U.S.C. 154(b) by 276 days.

(21) Appl. No.: 10/065,253

(22) Filed: Sep. 30, 2002

(65) Prior Publication Data

US 2004/0203744 A1 Oct. 14, 2004

Related U.S. Application Data

(60) Provisional application No. 60/405,629, filed on Aug. 23, 2002.

(51) Int. Cl.
*H04Q 7/20* (2006.01)

(52) U.S. Cl. .............................. 455/432.1; 455/552.1; 455/558; 455/433

(58) Field of Classification Search ................ 455/433, 455/432.1, 456.1, 466, 435, 406, 405, 407, 455/550, 551, 440, 414, 418, 456, 552.1, 455/558
See application file for complete search history.

(56) References Cited

U.S. PATENT DOCUMENTS 5,734,980 A 3/1998 Hooper et al.
6,493,547 B1 * 12/2002 Raith .......................... 455/405
6,708,033 B1 * 3/2004 Linkola et al. .............. 455/440

(Continued)

FOREIGN PATENT DOCUMENTS

WO  WO 99 11085  3/1999

OTHER PUBLICATIONS

ETSI: Digital Cellular Telecommunications System (Phase 2+); Specification of the subscriber Identity Module-Mobile Equipment (SIM-ME) interface (3PP TS 151 011 v4.4.0 (Jun. 2002) pp. 1-162, XP002270376.

*Primary Examiner*—Joseph Feild
*Assistant Examiner*—Wayne Cai
(74) *Attorney, Agent, or Firm*—Moore & Van Allen PLLC; Gregory A. Stephens

(57) ABSTRACT

A system and method for determining if a mobile phone is in a home area that does not rely exclusively on the HPLMN data programmed into the mobile phone. To determine whether the mobile phone is in a home area or in a roaming area a processor in the mobile phone checks the PLMN control information in an over-the-air received signal. If the PLMN data matches the PLMN data stored in the mobile phone SIM card IMSI file, then the current network is a home network. Otherwise, the received LAI control data is checked to see whether it matches any LAI data in the OPL file of the SIM card in the mobile phone. If the received LAI data does not match any LAI data in the OPL file, then the network is not a home network but a roamed into network. If the received LAI data does match LAI data in the OPL file, then the OPL file is further examined to see whether the PNN record that the OPL record points to is the first record in the PNN file. If it is, then the network is a home network. If it is not, then the network is a roamed into network.

24 Claims, 3 Drawing Sheets

U.S. PATENT DOCUMENTS

2002/0082049 A1 6/2002 Prise
2002/0197991 A1* 12/2002 Anvekar et al. ............ 455/432
2003/0022689 A1* 1/2003 McElwain et al. .......... 455/551
2004/0106413 A1* 6/2004 Sambin ................... 455/456.1

* cited by examiner

SYSTEM AND METHOD FOR HOME NETWORK DETERMINATION IN A MOBILE PHONE

BACKGROUND OF INVENTION

In GSM and some other cellular telephone networks, the Home Public Land Mobile Network (HPLMN) of a mobile phone is identified by the Mobile Country Code (MCC) and Mobile Network Code (MNC) pair contained within the International Mobile Subscriber Identity (IMSI) file on the Subscriber Identity Module (SIM) card resident in the mobile phone. For example, the MCC-MNC pair for the Raleigh, N.C. GSM HPLMN is 310-150. Note that the coverage of this HPLMN includes a large geographical area, including Charlotte and Atlanta, among other locations in the southeastern USA.

Due to industry mergers and consolidation, wireless carriers can be a conglomeration of previously disjoint network operators, each having its own HPLMN. A problem arises in that a mobile phone can only have one HPLMN identifier. Yet, a mobile phone can be considered in a home area even when it is outside its HPLMN area. This can occur when the mobile phone is within the coverage area of one of the other network operators that is under the aegis of the wireless carrier.

What is needed is a means for determining if a mobile phone is in a home area without having to rely exclusively on the HPLMN programmed into the mobile phone.

SUMMARY OF INVENTION

The present invention comprises a means for determining if a mobile phone is in a home area without having to rely exclusively on the HPLMN programmed into the mobile phone.

To determine whether the mobile phone is in a home area or in a roaming area a processor in the mobile phone checks the PLMN control information in an over-the-air received signal. If the PLMN data matches the PLMN data stored in the mobile phone SIM card IMSI file, then the current network is a home network. Otherwise, the received LAI control data is checked to see whether it matches any LAI data in the OPL file of the SIM card. If the received LAI data does not match any LAI data in the OPL file, then the network is not a home network but a roamed into network. If the received LAI data does match LAI data in the OPL file, then the OPL file is examined to see whether the PNN record that the OPL record points to is the first record in the PNN file. If it is, then the network is a home network. If it is not, then the network is a roamed into network.

DETAILED DESCRIPTION

The present invention utilizes the Enhanced Operator Name String (E-ONS) functionality included in mobile phones. For purposes of the present invention, E-ONS can provide a means to distinguish home networks while eliminating the need for the mobile to be customized or even updated when a home network list is modified.

The E-ONS feature is intended to provide an algorithm for determining what to display on the mobile's display with respect to the current service provider information via an alphanumeric tag on the mobile user interface. E-ONS uses a SIM file called Operator PLMN List (OPL) to provide sets of PLMN ranges along with pointers to associated alphanumeric tags contained in another SIM file called PLMN Network Name (PNN).

The OPL and PNN files on the SIM do not explicitly list the PLMNs that should be considered as home for the mobile phone. The present invention presents a method, however, that indicates which networks should be considered home. The method for determining the home networks from the E-ONS SIM files involves considering as home all PLMNs contained in the OPL file which point to the first PNN record.

The default HPLMN alphanumeric tag will be contained within the first record of the PNN file. For instance, in Carrier X's SIM profile specification, the first record of the PNN file could be for the home networks, and the alpha tag could be "Carrier X", whereas the second and third record tags could be "Carrier X-Roam" and "Roam", respectively.

Figure 1:
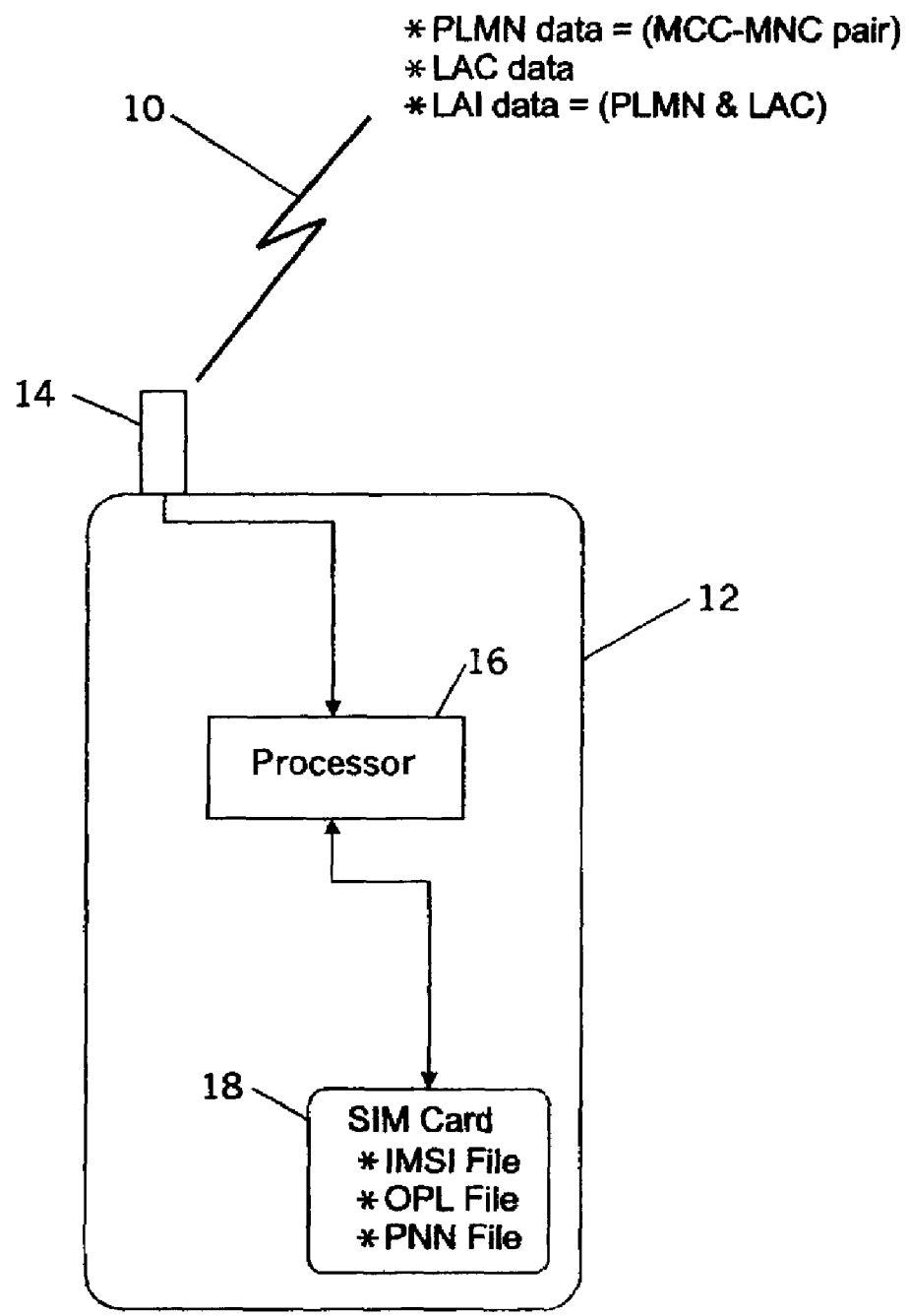
FIG. 1 illustrates a mobile phone with SIM card receiving an over-the-air signal.

FIG. 1 illustrates a mobile phone with SIM card receiving an over-the-air signal. The diagram has been abridged to illustrate only the elements of a mobile phone that are used by the present invention. A wireless signal 70 is received into a mobile phone 12 via an antenna 14. The signal contains control data including PLMN (Public Land Mobile Network) data and LAI (Location Area Information) data. The PLMN data is a composite of an MCC-MNC identifier. The LAI information is a composite of the PLMN data and an LAC (Location Area Code) identifier. The LAC is not to be confused with the more ubiquitous area code designations used to identify regions within the United States. The LAC identifier in the present invention refers to the ability of a mobile network to subdivide and identify its coverage area into location areas.

The received signal is forwarded from antenna 14 to a processor 16 for analysis. Processor 16 is also coupled with SIM card 18. SIM card 18 includes, among other things, an IMSI (International Mobile Subscriber Identity) file, an OPL (Operator PLMN List) file, and a PNN (PLMN Network Name) file.

Figure 2:
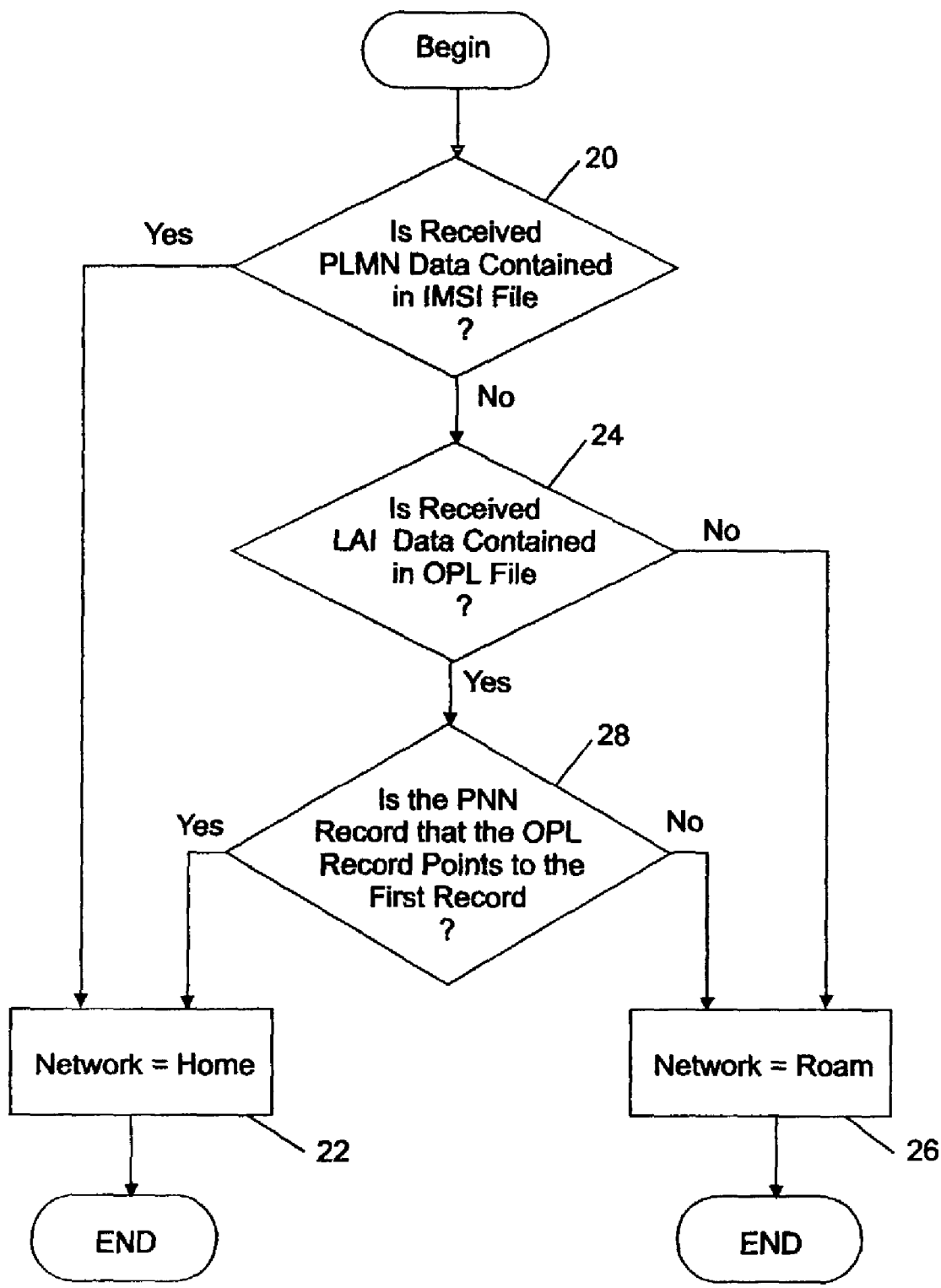
FIG. 2 illustrates a flowchart for implementing the present invention.

FIG. 2 illustrates a flowchart for implementing the present invention. To determine whether the mobile phone is in a home area or in a roaming area the processor first performs a check on the PLMN control information in the received signal. If the currently received PLMN data matches the PLMN data in the SIM card's IMSI file 20, then the network is deemed to be a home network 22. If the currently received PLMN data does not match the PLMN data in the SIM card's IMSI file, then the currently received LAI data is checked to see whether it matches any LAI data in the OPL file of the SIM card 24. If the currently received LAI data does not match any LAI data in the OPL file, then the current network is deemed to be a roaming network 26. If the currently received LAI data does match LAI data in the OPL file, then the OPL file is examined to see whether the PNN record that the OPL record points to is the first record in the PNN file 28. If it is, then the network is a home network 22. If it is not, then the network is a roaming network 26.

Figure 3:
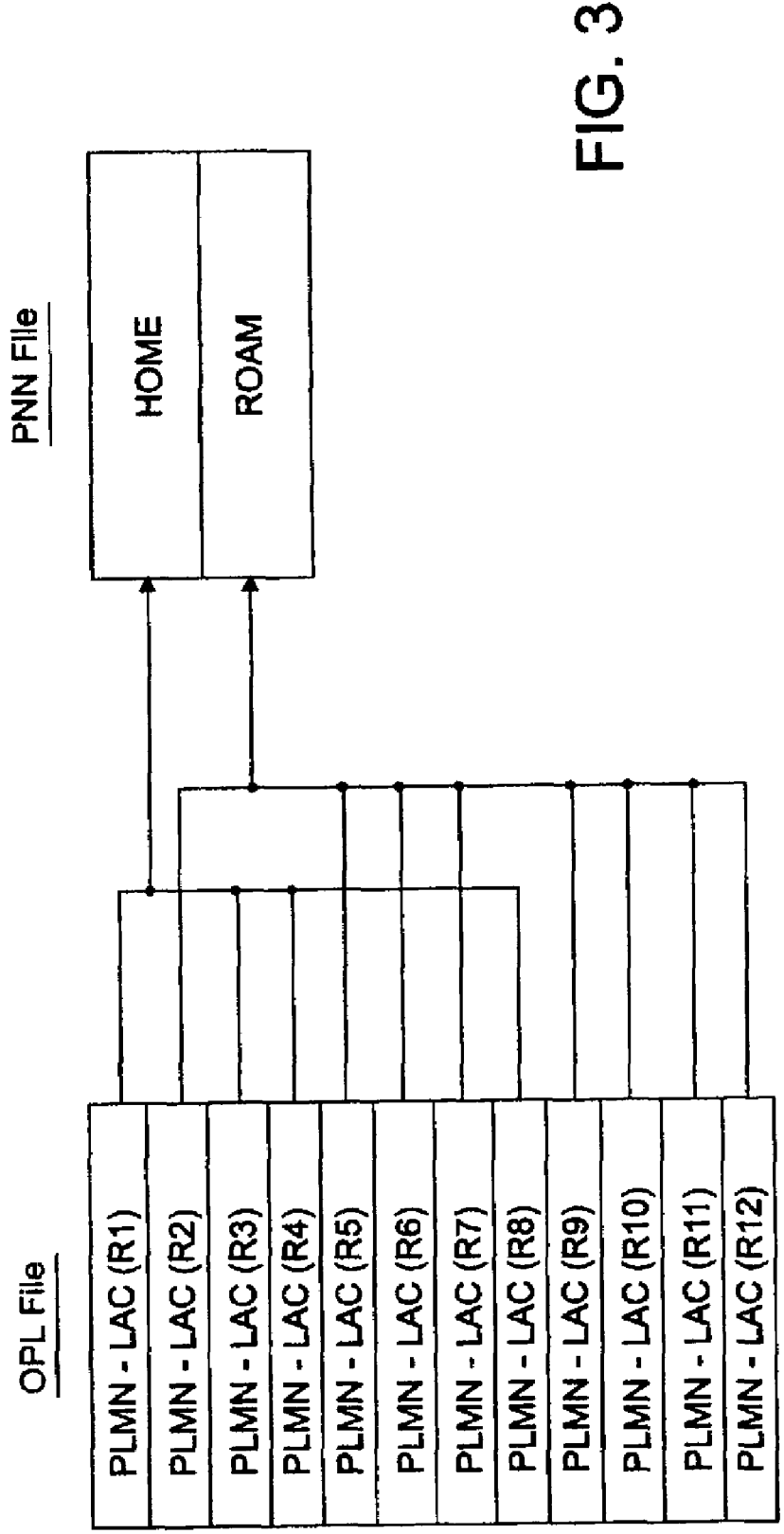
FIG. 3 illustrates a sample OPL and PNN file with a pointer relationship between them.

FIG. 3 illustrates a sample OPL and PNN file with a pointer relationship between them. The OPL file is a collection of records in which each contains LAI data. The LAI data is comprised of PLMN and LAC data. The PNN file contains records indicating what type of network should be displayed on the mobile phone's display. In this example, we have simplified the choices to either home or roam. As stated earlier, the OPL and PNN files are referred to as the E-ONS files and are resident on the SIM card.

FIG. 3 shows that records 1, 3, 4, and 8 point to the first record of the PNN file. Thus, when current LAI data received over the air matches one of the aforementioned records in the OPL file that point to the first record in the PNN file, then the network is deemed to be a home network. If the LAI information does not match one of the OPL records that points to the first record of the PNN file, then the current network is deemed a roaming network.

Once the type of network is determined, the mobile phone can respond accordingly. For instance, one use for the present invention provides an audible or visual indication that the mobile phone has entered an area in which roaming charges may apply. If the home network determination process has determined that the mobile phone is currently in a roaming area, then an indicator such as a special tone, a screen display icon, or lit indicator bulb can signal to the user that roaming charges are now in effect.

Another use for the present invention provides a means for determining whether a digital or analog circuit switched data (CSD) connection for wireless application protocol (WAP) data services should be used. Certain wireless carriers require that when a mobile telephone is within its home PLMN, it shall always setup a Direct IP (a.k.a. UDI or ISDN) connection for a WAP session. However, when roaming into another carrier's network, the mobile phone shall always setup 3.1 kHz audio (a.k.a. Analog or modem) connection for a WAP session. Thus the present invention can be used to determine whether the mobile phone is at home or roaming and consequently what type of CSD connection shall be used for a WAP session.

There are several advantages for using the present invention to determine whether a mobile phone is in a home network area or has roamed into another carrier's network. The present invention provides a mechanism for indicating when a mobile phone is in a home network even when the carrier spans multiple HPLMN coverage areas. This is significant since a mobile can only be linked to a single HPLMN. The list of home networks within the aegis of a carrier can be updated since the information is stored in the E-ONS files on the SIM card. The SIM card is readily updateable in an over-the-air fashion. This is especially advantageous because it is a dynamic file update as opposed to a hardware modification, a software modification, or a solution that requires standards modifications. Standards modifications are time consuming at best and there is no guarantee of a consensus within the standards community. Over-the-air file updates are the most desirable since they impact the consumer and the carrier the least in terms of cost, convenience, and time.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any hardware described herein form the various means for carrying out the functions of the invention in the example embodiments.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of means for is intended to evoke a means-plus-function reading of an element and a claim, whereas, any elements that do not specifically use the recitation means for, are not intended to be read as means-plus-function elements, even if the claim otherwise includes the word means.

What is claimed is:

1. A method of determining whether a mobile phone is currently in a home network or a roaming network, the mobile phone including a SIM card resident thereon, the SIM card including an IMSI file, an OPL file, and a PNN file, each file having a record structure, the method comprising:

receiving, in the mobile phone, an over-the-air signal comprised of control data including public land mobile network (PLMN) data and location area information (LAI) data;

comparing the received PLMN data to PLMN data stored in the IMSI file on the SIM card, and if the received PLMN data matches the stored PLMN data, then determining that the current network is a home network; otherwise checking whether the received LAI data is contained in the OPL file, and if not, then determining that the current network is a roaming network; otherwise checking if the PNN record that the OPL record points to is the first record of the PNN file, and if it is, then determining that the current network is a home network; otherwise determining that the current network is a roaming network.

2. The method of claim 1 wherein the networks are GSM networks.

3. The method of claim 2 further comprising establishing, upon a WAP session request, a digital CSD connection if the network is a home network.

4. The method of claim 2 further comprising establishing, upon a WAP session request, an analog CSD connection if the network is a roaming network.

5. The method of claim 2 further comprising providing an audible signal when the mobile phone is in a roaming network to indicate that roaming charges apply while the mobile phone is in the roaming network.

6. The method of claim 2 further comprising providing a visual signal when the mobile phone is in a roaming network to indicate that roaming charges apply while the mobile phone is in the roaming network.

7. A system for determining whether a mobile phone is currently in a home network or a roaming network, the mobile phone including a SIM card resident thereon, the SIM card including an IMSI file, an OPL file, and a PNN file, each file having a record structure, the system comprising:
 means for receiving, in the mobile phone, an over-the-air signal comprised of control data including public land mobile network (PLMN) data and location area information (LAI) data;
 means for comparing the received PLMN data to PLMN data stored in the IMSI file on the SIM card, and if the received PLMN data matches the stored PLMN data, then determining that the current network is a home network; otherwise
 means for checking whether the received LAI data is contained in the OPL file, and if not, then determining that the current network is a roaming network; otherwise
 means for checking if the PNN record that the OPL record points to is the first record of the PNN file, and if it is, then determining that the current network is a home network; otherwise
 determining that the current network is a roaming network.

8. The system of claim 7 wherein the networks are GSM networks.

9. The system of claim 8 further comprising means for establishing, upon a WAP session request, a digital CSD connection if the network is a home network.

10. The system of claim 8 further comprising means for establishing, upon a WAP session request, an analog CSD connection if the network is a roaming network.

11. The system of claim 8 further comprising indicator means for providing an audible signal when the mobile phone is in a roaming network to indicate that roaming charges apply while the mobile phone is in the roaming network.

12. The system of claim 8 further comprising indicator means for providing a visual signal when the mobile phone is in a roaming network to indicate that roaming charges apply while the mobile phone is in the roaming network.

13. A computer program product embodied on a computer readable storage medium for determining whether a mobile phone is currently in a home network or a roaming network, the mobile phone including a SIM card resident thereon, the SIM card including an IMSI file, an OPL file, and a PNN file, each file having a record structure, the computer program product comprising:
 computer program code for receiving, in the mobile phone, an over-the-air signal comprised of control data including public land mobile network (PLMN) data and location area information (LAI) data;
 computer program code for comparing the received PLMN data to PLMN data stored in the IMSI file on the SIM card, and if the received PLMN data matches the stored PLMN data, then determining that the current network is a home network; otherwise
 computer program code for checking whether the received LAI data is contained in the OPL file, and if not, then determining that the current network is a roaming network; otherwise
 computer program code for checking if the PNN record that the OPL record points to is the first record of the PNN file, and if it is, then determining that the current network is a home network; otherwise
 determining that the current network is a roaming network.

14. The computer program product embodied on a computer readable storage medium of claim 13 wherein the networks are GSM networks.

15. The computer program product embodied on a computer readable storage medium of claim 14 further comprising computer program code for establishing, upon a WAP session request, a digital CSD connection if the network is a home network.

16. The computer program product embodied on a computer readable storage medium of claim 14 further comprising computer program code for establishing, upon a WAP session request, an analog CSD connection if the network is a roaming network.

17. The computer program product embodied on a computer readable storage medium of claim 14 further comprising computer program code for providing an audible signal when the mobile phone is in a roaming network to indicate that roaming charges apply while the mobile phone is in the roaming network.

18. The computer program product embodied on a computer readable storage medium of claim 14 further comprising computer program code for providing a visual signal when the mobile phone is in a roaming network to indicate that roaming charges apply while the mobile phone is in the roaming network.

19. A mobile phone that can determine whether it is currently in a home network or a roaming network, the mobile phone comprising:
 a SIM card including an IMSI file, an OPL file, and a PNN file, each file having a record structure; and
 a processor coupled with said SIM card, the processor for:
 receiving a signal comprised of control data including public land mobile network (PLMN) data and location area information (LAI) data;
 comparing the received PLMN data to PLMN data stored in the IMSI file on the SIM card, and if the received PLMN data matches the stored PLMN data, then determining that the current network is a home network; otherwise
 checking whether the received LAI data is contained in the OPL file, and if not, then determining that the current network is a roaming network; otherwise
 checking if the PNN record that the OPL record points to is the first record of the PNN file, and if it is, then determining that the current network is a home network; otherwise
 determining that the current network is a roaming network.

20. The mobile phone of claim 19 wherein the networks are GSM networks.

21. The mobile phone of claim 20 further comprising establishing, upon a WAP session request, a digital CSD connection if the network is a home network.

22. The mobile phone of claim 20 further comprising establishing, upon a WAP session request, an analog CSD connection if the network is a roaming network.

23. The mobile phone of claim 20 further comprising an indicator for providing an audible signal when the mobile phone is in a roaming network to indicate that roaming charges apply while the mobile phone is in the roaming network.

24. The mobile phone of claim 20 further comprising an indicator for providing a visual signal when the mobile phone is in a roaming network to indicate that roaming charges apply while the mobile phone is in the roaming network.

* * * * *